United States Patent
Tabata et al.

(10) Patent No.: US 9,840,175 B2
(45) Date of Patent: Dec. 12, 2017

(54) FOAMING DIE DEVICE ADAPTED TO EFFECT FOAMING IN TRIM COVER ASSEMBLY INTEGRALLY TO FORM HEADREST, AND FOAMING PROCESS FOR FORMING HEADREST BY EFFECTING FOAMING IN TRIM COVER ASSEMBLY INTEGRALLY, USING THE FOAMING DIE DEVICE

(71) Applicant: TACHI-S CO., LTD., Tokyo (JP)

(72) Inventors: Tsuyoshi Tabata, Tokyo (JP); Takafumi Kojima, Tokyo (JP)

(73) Assignee: TACHI-S CO., LTD. (JP)

( * ) Notice: Subject to any disclaimer, the term of this patent is extended or adjusted under 35 U.S.C. 154(b) by 818 days.

(21) Appl. No.: 14/298,325

(22) Filed: Jun. 6, 2014

(65) Prior Publication Data
US 2014/0374940 A1  Dec. 25, 2014

(30) Foreign Application Priority Data
Jun. 19, 2013  (JP) ................................ 2013-128114

(51) Int. Cl.
*B60N 2/70* (2006.01)
*B60N 2/48* (2006.01)
(Continued)

(52) U.S. Cl.
CPC ........ *B60N 2/7017* (2013.01); *B29C 44/1233* (2013.01); *B29C 44/1257* (2013.01);
(Continued)

(58) Field of Classification Search
CPC .... B29D 99/0092; B60N 2/7017; B60N 2/48; B60N 2/4808; B60N 2/5891;
(Continued)

(56) References Cited

U.S. PATENT DOCUMENTS 5,478,136 A * 12/1995 Takeuchi ................ B29C 33/12
264/46.7
2009/0167069 A1* 7/2009 Tabata ................ B29C 44/1271
297/391

FOREIGN PATENT DOCUMENTS

JP   H4-201418 A    7/1992
JP   H06 170861 A * 6/1994  ........... B60R 21/055
(Continued)

OTHER PUBLICATIONS

JP H06 170861A, Teruo Ogiso, "Method for forming stay seal part of headrest mold", Jun. 21, 1994, Translated from Japanese from google.*

(Continued)

*Primary Examiner* — Alison L Hindenlang
*Assistant Examiner* — Yunju Kim
(74) *Attorney, Agent, or Firm* — Ostrolenk Faber LLP

(57) ABSTRACT

A foaming die device for forming a headrest is provided, which comprises a lower die having a first protrusion and an upper die having a second protrusion. The lower and upper dies are used for accommodating a trim cover assembly with a headrest stay portion extending outwardly through a stay passage hole formed in the trim cover assembly. The first and second protrusions are adapted to press and turn over a projected area created about the stay hole into the inside of that trim cover assembly. Also, a foaming process for forming the headrest, using this foaming die device, is provided, in which the projected area is turned over by the first and second protrusions into the trim cover assembly when placing the trim cover assembly in the dies. Hence, conventional preliminary steps using cylindrical stick to turn over the projected area into the trim cover assembly are eliminated.

5 Claims, 5 Drawing Sheets

(51) Int. Cl.
  *B29C 44/34* (2006.01)
  *B60N 2/58* (2006.01)
  *B29C 44/12* (2006.01)
  B29L 31/30 (2006.01)
  B29K 75/00 (2006.01)

(52) U.S. Cl.
  CPC .......... *B29C 44/351* (2013.01); *B60N 2/4808* (2013.01); *B60N 2/5891* (2013.01); *B29K 2075/00* (2013.01); *B29L 2031/3023* (2013.01)

(58) Field of Classification Search
  CPC ............ B29C 44/1233; B29C 44/1257; B29C 44/351; B29K 2075/00; B29K 105/04; B29K 105/20; B29L 2031/3023; B29L 31/58; A47C 7/36; A47C 7/38; B60R 21/055
  USPC .............................................. 264/46; 297/391
  See application file for complete search history.

(56) References Cited

FOREIGN PATENT DOCUMENTS

| JP | 2007-195767 A | 8/2007 | |
| JP | 2012-245081 | 12/2012 | |
| JP | WO 2013157068 A1 * | 10/2013 | ............... B60N 2/48 |

OTHER PUBLICATIONS

WO2013157068A1—Machine Translation.*
Notification of Reasons for Refusal dated Oct. 4, 2016 in corresponding Japanese Patent Application No. 2013-1228114 (with English language translation)(total 8 pages).

* cited by examiner

FOAMING DIE DEVICE ADAPTED TO EFFECT FOAMING IN TRIM COVER ASSEMBLY INTEGRALLY TO FORM HEADREST, AND FOAMING PROCESS FOR FORMING HEADREST BY EFFECTING FOAMING IN TRIM COVER ASSEMBLY INTEGRALLY, USING THE FOAMING DIE DEVICE

BACKGROUND OF THE INVENTION

1. Field of the Invention

The present invention relates to a foaming die device adapted to effect foaming in a headrest trim cover assembly (or a surface covering element for headrest) in an integral manner to form a headrest for use with an automotive seat, and also relates to a foaming process for forming the headrest, which entails forming a foam padding in the headrest trim cover assembly in an integral manner, using the foaming die device.

2. Description of Prior Art

For example, Japanese Laid-Open Publication No. 2012-245081 (JP 2012-245081 A) discloses a typical conventional process for forming a headrest for use with an ordinary automotive seat, which includes the step of installing a substantially U-shaped headrest stay in a trim cover assembly preformed in a bag-like three-dimensional shape, prior to the step of placing the trim cover assembly in a foaming die device. As usually found in the art, such substantially U-shaped headrest stay includes a pair of substantially-rectilinear stay portions (hereinafter, it shall be referred to as "first substantially-rectilinear stay portion" and "second substantially-rectilinear stay portion") formed integrally therewith, which are adapted to be mounted in a seat back. On the other hand, the trim cover assembly is formed with a pair of stay passage holes (hereinafter, it shall be referred to as "first stay passage hole" and "second passage hole") adapted for allowing the first and second substantially-rectilinear stay portions to be inserted therein and passed therethrough, respectively.

According to the conventional process, at first, a worker inserts the first substantially-rectilinear stay portion of the headrest stay into the second stay passage hole of the trim cover assembly, wherein the second stay passage hole is a hole in which the second substantially-rectilinear stay portion normally exists when the headrest stay is installed in the trim cover assembly. Then, the worker manages to continue on pushing that first substantially-rectilinear stay portion, via the second stay passage hole, into the inside of the trim cover assembly and causing the same to advance within the trim cover assembly towards the first stay passage hole, so that the first substantially-rectilinear stay portion eventually projects outwardly from the trim cover assembly through that first stay passage hole, while ascertaining that the second substantially-rectilinear stay portion passes through and yet remains in the earlier-stated second stay passage hole. In that way, the headrest stay is installed within the trim cover assembly, such that both first and second substantially-rectilinear stay portions pass through the first and second stay passage holes, respectively, and project outwardly from the trim cover assembly. Next, a foaming die device is provided, which has upper and lower dies. The trim cover assembly with the headrest stay thus installed therein is placed in and between two cavity regions respectively of the upper and lower dies, and then, the upper and lower dies are closed and mated with each other. Thereafter, a liquid foaming agent is injected via an injection nozzle into the inside of the trim cover assembly placed in those upper and lower dies and cured to form a foam padding filled in that trim cover assembly in an integral manner, so that a resulting headrest for automotive seat is produced.

However, in the above-described conventional headrest production process, at the step of pushing the first and second substantially-rectilinear stay portions outwardly through the first and second stay passage holes, respectively, prior to the trim cover assembly being placed in the dies, there has been a problem in that, when the first and second substantially-rectilinear stay portions are inserted in and passed through the respective first and second stay passage holes, a peripheral edge portion of each of the first and second stay passage holes, by the reason of its being in frictional contact about the corresponding substantially-rectilinear stay portion, is forcibly stretched outwardly from the outer surface of trim cover assembly. As a result thereof, a cylindrically projected local area is created in the peripheral end of each of the first and second stay passage holes and laid on and about the corresponding substantially-rectilinear stay portion outside of the trim cover assembly. Such cylindrically projected local area is therefore exposed exteriorly of the trim cover assembly, which undesirably impairs an outer aesthetic appearance of a resulting headrest. To avoid creation of the cylindrically projected local area, before placing the trim cover assembly in the dies, it is required or customary in the past for a worker to use a cylindrical stick for the purpose of pressing and turning over such cylindrically projected local area into the inside of the trim cover assembly. That is, the worker causes each of the first and second substantially-rectilinear stay portions to insert in a through-bore of such cylindrical stick and moves the cylindrical stick along the substantially-rectilinear stay portion towards the trim cover assembly, to the extent that the circular distal end of that cylindrical stick contacts and presses the afore-said cylindrically projected local area. Then, the worker continues to move the cylindrical stick further, so that a whole of the cylindrically projected local area is turned over reversely relative to the stay passage hole and positioned inside of the trim cover assembly, thereby avoiding external exposure of that cylindrically projected local area. In that way, the outer peripheral region of each of the first and second stay insertion holes is made flat and even on the outer surface of the trim cover assembly, hence maintaining the outer aesthetic appearance of resulting headrest. This is an ordinary conventional means to avoid external exposure of the afore-said projected area in question, which is created about each of the first and second stay passage holes. However, such conventional method has imposed annoying inefficient steps upon the workers, because he or she is compelled to use the cylindrical sticks for each of many trim cover assemblies, troublesomely, prior to the step of placing the trim cover assembly in the foaming die device.

SUMMARY OF THE INVENTION

In view of the afore-stated drawbacks, it is a first purpose of the present invention to provide a foaming die device for forming a headrest, which eliminates the above-described conventional preliminary steps for turning over the afore-said projected area in question into the inside of a trim cover assembly, prior to the step of placing the trim cover assembly in the foaming die device.

In order to achieve such purpose, in accordance with the present invention, there is provided a foaming die device so constructed as to allow accommodation therein of a trim cover assembly in which a headrest stay is installed therein such that at least one stay portion of the headrest stay passes through at least one stay passage hole of said trim cover assembly and is exposed exteriorly of the trim cover assembly, wherein a projected area is created in a peripheral end of the at least one stay passage hole and laid on and about the at least one stay portion so as to be exposed exteriorly of the trim cover assembly, and further allow a liquid foaming agent to be injected into an inside of the trim cover assembly and cured therein, to thereby form a headrest having the at least one stay portion exposed exteriorly thereof, the foaming die device basically comprising:
an upper die having a cavity region and a second mating surface;
a lower die having a cavity region and a first mating surface adapted to be mated with the second mating surface of the upper die;
the upper and lower dies being able to be mated with and separated from each other;
wherein, when the upper and lower dies are mated with each other, a cavity is defined between the cavity region of the upper die and the cavity region of the lower die, the cavity being of such a dimension as to accommodate a whole of the trim cover assembly therein,
a first stay receiving recession formed in the first mating surface of the lower die, the first stay receiving recession being so configured to receive the at least one stay portion;
a second stay receiving recession formed in the second mating surface of the upper die, the first stay receiving recession being so configured to receive the al least one stay portion;
a first protrusion provided in the lower die, the first protrusion protruding in a direction from an inner wall of the lower die towards the cavity region of the lower die;
a second protrusion provided in the upper die, the second protrusion protruding in a direction from an inner wall of the upper die towards the cavity region of the upper die; and
the first and second protrusions being adapted to press and turn over the projected area relative to the at least one stay passage hole into the inside of the trim cover assembly.

Accordingly, when pressing a bottom wall of the trim cover assembly against the inner wall of the upper die towards the first and second protrusions, it is to be appreciated that such first and second protrusions are inserted into the at least one stay passage hole, which in turn causes the afore-said projected area to turn over in relation to the said one stay passage hole, with the result that the projected area is entirely folded into the inside of the trim cover assembly and positioned therein. Thereafter, the upper die is mated with the lower die to close the foaming die device, so that the at least one stay portion is partly sandwiched by the first and second stay receiving recessions. In other words, a worker has only to set the trim cover assembly in the cavity of the foaming die device and simply cause the projected areas exposed exteriorly of the trim cover assembly to turn over at the first and second protrusions relative to the at least one stay passage hole into the inside of the trim cover assembly. This eliminates the previously-described conventional preliminary steps requiring troublesome use of cylindrical sticks to turn over the projected area into the inside of trim cover assembly.

It is a second purpose of the present invention to permit easy and assured insertion of the first and second protrusions into the at least one stay passage hole in the longitudinal direction of the at least one stay portion.

For that purpose, the first protrusion may be so formed to become small in thickness as it proceeds to an distal end thereof and have an extension surface forming one part of a wall surface of a first wall which defines the first stay receiving recession, whereas the first protrusion be so formed to become small in thickness as it proceeds to an distal end thereof and have an extension surface forming one part of a wall surface of a second wall which defines the second stay receiving recession.

As another preferred aspect of the invention, a first stay receiving element may be securely provided to the lower die, the first stay receiving element being adapted to receive the afore-said at least one stay portion, whereas a second stay receiving element be securely provided to the upper die, the second stay receiving element being adapted to receive the at least one stay portion. In this mode, the first stay receiving element comprises: a body portion secured to the lower die; and the afore-said first protrusion, wherein the first protrusion protrudes from the body portion towards the cavity region of the lower die, whereas the second stay receiving element comprises: a body portion secured to the upper die; and the afore-said second protrusion, wherein the second protrusion protrudes from the body portion towards the cavity region of the upper die. With this arrangement, when the first and second stay receiving elements become worn out of use, it is easily possible to replace them all or either of them by new corresponding stay receiving element(s). Moreover, one or both of the two stay receiving elements can be modified in terms of technical design and specifications, as required.

As still another preferred aspect of the invention, the afore-said body portion and first protrusion of the first stay receiving element as well as the afore-said body portion and second protrusion of the second stay receiving element may be formed in a substantially semi-cylindrical shape. Also, the body portions respectively of the first and second stay receiving elements may be securely connected to the lower and upper dies, respectively, by at least one securing screw. This arrangement allows the first and second stay receiving elements to be easily secured and removed from the lower and upper dies, respectively, by use of the at least one screw, thus enabling a worker to easily replace one or both of those two stay receiving elements by a new corresponding stay receiving element (s).

It is a third purpose of the present invention to provide a foaming process for forming a headrest, which eliminates the above-described preliminary steps using the cylindrical sticks to press the afore-said projected area in question into the inside of a trim cover assembly, prior to the step of placing the trim cover assembly in the foaming die device.

To achieve such purpose, in accordance with the present invention, there is basically provided the steps of:
providing a foaming die device comprising: an upper die having a cavity region defined therein; and a lower die having a cavity region defined therein, the upper and lower dies being able to be mated with and separated from each other; wherein a first protrusion is provided in the lower die so as to protrude in a direction from an inner wall of the lower die towards the cavity region of the lower die, whereas a second protrusion is provided in the upper die so as to protrude in a direction from an inner wall of the upper die towards the cavity region of the upper die;
providing a headrest stay having at least one stay portion extending therefrom;

providing a trim cover assembly having at least one stay passage hole adapted to allow the at least one stay portion to pass therethrough;

installing the headrest stay within the trim cover assembly, such that the at least one stay portion of the headrest stay passes through the at least one stay passage hole and extends outwardly of the trim cover assembly, with a projected area being created in a peripheral end of the at least one stay passage hole and laid on the at least one stay portion so as to be exposed exteriorly of the trim cover assembly;

thereafter, placing the trim cover assembly with the headrest stay thus installed therein, in a cavity defined between the cavity region of the upper die and the cavity region of the lower die, such that the first and second protrusions are inserted into the at least stay passage hole of the trim cover assembly, thereby causing the projected area to turn over relative to the at least one stay passage hole into the inside of the trim cover assembly; and thereafter, injecting a liquid foaming agent into the inside of the trim cover assembly and curing the liquid foaming agent into an increased mass of foam padding filled in the trim cover assembly.

By the virtue of the above-described steps, the first and second protrusions can be easily inserted into the at least one stay passage hole, which in turn causes the afore-said projected area in question to turn over in relation to the said one stay passage hole, with the result that the projected area is entirely folded into the inside of the trim cover assembly and positioned therein. Therefore, a worker has only to set the trim cover assembly in the cavity of the foaming die device and simply cause the projected area exposed exteriorly of the trim cover assembly to turn over at the first and second protrusions relative to the at least one stay passage hole into the inside of the trim cover assembly. This eliminates the previously-described conventional preliminary steps requiring troublesome use of cylindrical sticks to turn over the projected area into the inside of trim cover assembly.

Other various features and advantages will become apparent from reading of the description, hereinafter, with reference to the accompanied drawings.

DETAILED DESCRIPTION OF PREFERRED EMBODIMENT OF THE INVENTION

Figure 1:
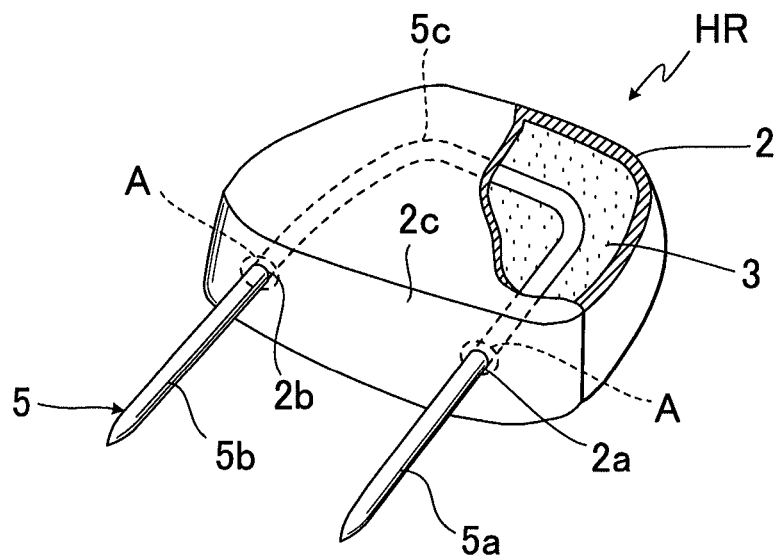
FIG. 1 is a partly broken perspective view of a headrest which is formed by a foaming die device in accordance with the present invention.

FIG. 1 shows a resulting headrest HR formed under a foaming process in accordance with the present invention. The headrest HR has: a trim cover assembly 2 formed by sewing several cover materials together in a bag-like three-dimensional shape; a foam padding 3 which is formed in the trim cover assembly 2 under the steps of injecting a liquid foaming agent (e.g. a liquid urethane material capable of being foamed) into the inside of the trim cover assembly 2 and then curing the liquid foaming agent to form an increased mass of the foam padding 3 filled in the trim cover assembly; and a headrest stay 5 securely provided within the foam padding 3.

While not shown clearly, the trim cover assembly 2, which forms a surface cover of the headrest, is of a two-layer lamination construction consisting of: a top cover member made of an unbreathable, impermeable synthetic leather material; and a foam wadding affixed on the reverse surface of that top cover member, the foam wadding being made of a slab urethane foam material. The headrest stay 5 is formed in a substantially "U" configuration which has: a substantially U-shaped body portion 5c embedded in the foam padding 3; and a pair of substantially-rectilinear stay portions 5a and 5b (which shall hereinafter be referred to as "a first substantially-rectilinear stay portion 5a" and "a second substantially-rectilinear stay portion 5b", respectively). As seen in FIG. 1, in the bottom wall 2c of the trim cover assembly 2, there are formed a pair of stay passage holes 2a and 2b (which shall hereinafter be referred to as "a first stay passage hole 2a" and "a second stay passage hole 2b", respectively). The first and second substantially-rectilinear stay portions 5a and 5b are shown as passing through the first and second stay passage holes 2a and 2b, respectively, and being exposed exteriorly of the trim cover assembly 2.

Figure 2:
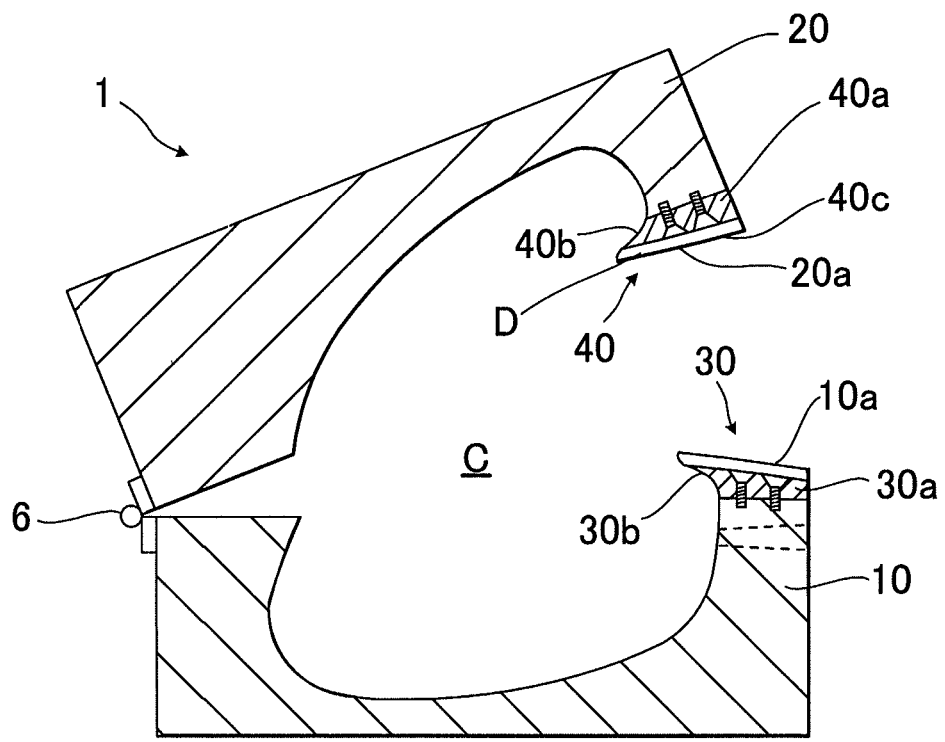
FIG. 2 is a sectional view showing one exemplary mode of the foaming die device.

FIG. 2 shows a foaming die device 1 by which the trim cover assembly 2 with the headrest stay 5 installed therein as stated above can be subjected to foaming in integral manner. By use of such foaming die device 1, the above-described headrest HR is formed. This foaming die device 1 comprises an upper die 20 and a lower die 10. The upper and lower dies 20 and 10 are hingedly connected by a hinge 6 with each other, so that the upper die 20 can be moved away from the lower die 10 to open the foaming die device 1 and mated therewith to close the latter 1. As shown, each of the upper and lower dies 20 and 10 has a cavity region defined therein, and therefore, when the upper and lower dies 20 and 10 are mated with each other, a cavity C is defined therebetween. The cavity C is so configured to accommodate an entirety of the trim cover assembly 2 therein. The upper die 10 has a first mating surface 10a, whereas the upper die 20 has a second mating surface 20a. When mating the upper die 20 with the lower die 10 to close the foaming die device 1, such two mating surfaces 10a and 20a are mated and contacted with each other closely. The lower die 10 is provided with a first stay receiving element 30 in the first mating surface 10a thereof, wherein the first stay receiving element 30 is so configured to receive a part of lower half of the substantially-rectilinear stay portion of the headrest stay 5. On the other hand, the upper die 20 is provided with a second stay receiving element 40 in the second mating surface 20a thereof, wherein the second stay receiving element 40 is so configured to embracingly overlie a part of upper half of the substantially-rectilinear stay portion of the headrest stay 5.

Figure 3:
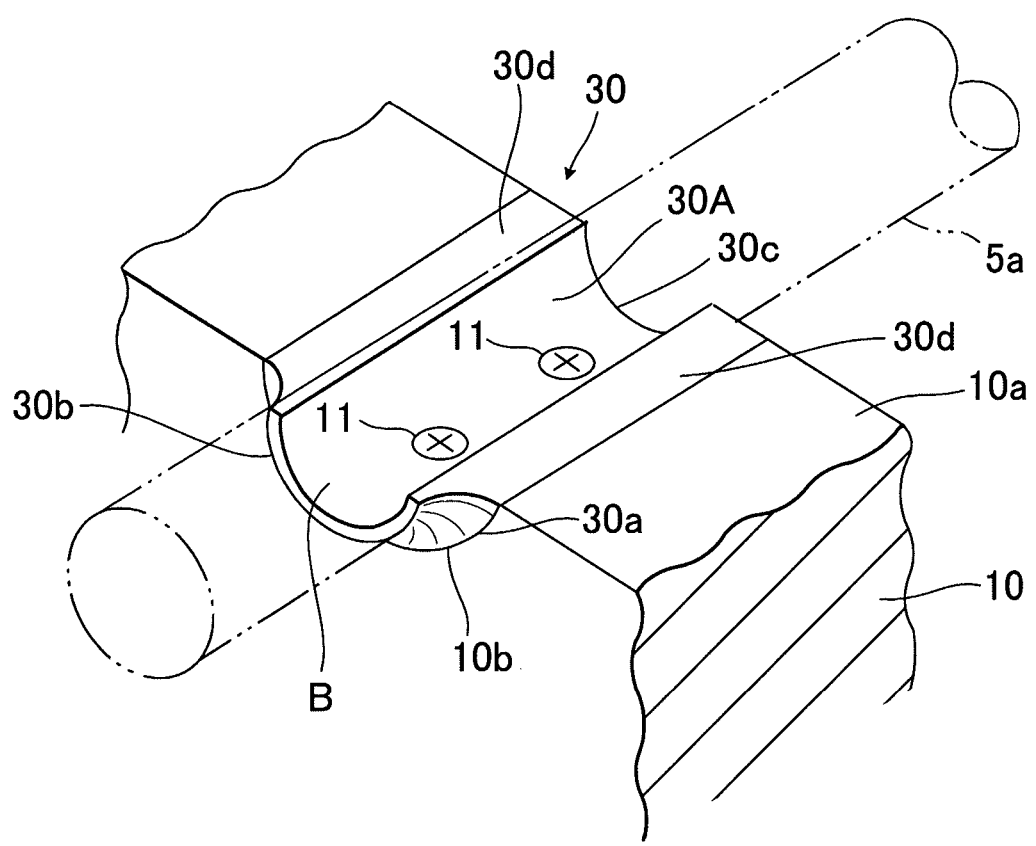
FIG. 3 is a partly broken perspective view showing a stay receiving element provided in a lower die of the foaming die device.
Figure 4:
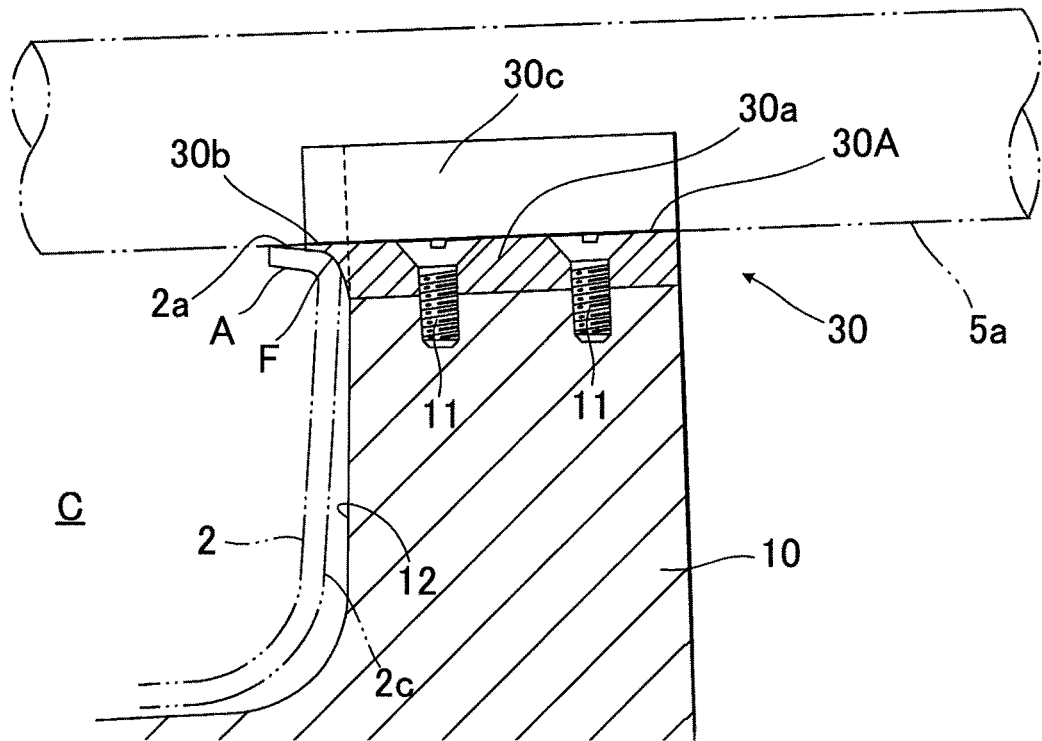
FIG. 4 is a fragmentary sectional view showing the stay receiving element provided in the lower die.

As best shown in FIGS. 3 and 4, the first stay receiving element 30 is fixedly secured by securing screws 11 to the lower die 10. Specifically, the lower die 10 is formed with a recession 10b of semicircular cross-section, whereas the first stay receiving element 30 has a first semi-cylindrical main portion 30a defined therein. The first semi-cylindrical main portion 30a is secured fit in the recession 10b of the lower die 10. Further, the first stay receiving element 30 has a semi-cylindrical protrusion 30b. This semi-cylindrical protrusion 30b is shown as protruding in a direction from an inner wall 12 of the lower die 10 towards the cavity region of the lower die 10 which forms one of the cavity C. As will be described later, by means of such semi-cylindrical protrusion 30b, a cylindrically projected area A created from and about each of the first and second stay passage holes 2a and 2b can be forcibly turned over into the inside of the trim cover assembly 2.

As shown, the first semi-cylindrical main portion 30a is received in the recession 10b and fixedly secured thereto by two securing screws 11 and 11.

Prior to a foaming process using the foaming die device 1, while not shown, there are the steps of providing a hollow trim cover assembly 2 with the headrest stay 5 installed therein, such that both first and second substantially-rectilinear stay portions 5a and 5b of the headrest stay 5 project outwardly from the trim cover assembly 2. In such preliminary steps, as normally done in the art, a worker inserts the first substantially-rectilinear stay portion 5a into the second stay passage hole 2b of the trim cover assembly 2 and then manages to continue on pushing that first substantially-rectilinear stay portion 5a, via the second stay passage hole 2b, into the inside of the trim cover assembly 2 and causing that stay portion 5a to advance within the trim cover assembly 2 towards the first stay passage hole 2a, so that the first substantially-rectilinear stay portion 5a projects outwardly from the trim cover assembly 2 through the second stay passage hole 2b, while ascertaining that the second substantially-rectilinear stay portion 5b passes through and yet remains in the earlier-stated first stay passage hole 2a. In that way, the headrest stay 5 is installed within the trim cover assembly 2 which is hollow inside thereof at this stage, such that both first and second substantially-rectilinear stay portions 5a and 5b thereof are exposed exteriorly of the trim cover assembly. It is noted here that the first and second substantially-rectilinear stay portions 5a and 5b are closely contacted with the first and second stay passage holes 2a and 2b, respectively. Therefore, as previously stated in the description of prior art, at the above-described step of pushing the first and second substantially-rectilinear stay portions 5a and 5b outwardly through the first and second stay passage holes 2a and 2b, respectively, it is inevitable that both two peripheral edges respective of those first and second stay passage hoes 2a and 2b are forcibly stretched in a direction outwardly of the trim cover assembly 2. As a result thereof, a cylindrically projected area is created from and about each of the first and second stay passage holes 2a and 2b. In other words, a pair of such cylindrically projected areas respective of the two stay passage holes 2a and 2b are laid on and about the two substantially-rectilinear stay portions 5a and 5b, respectively, thus projecting outwardly of the trim cover assembly 2. Such two cylindrically projected areas can be recognized by the designations A and A in the drawings.

Next, the above-stated hollow trim cover assembly 2 with the two cylindrically projected areas A and A exposed exteriorly thereof is placed in the cavity region of the lower die 10, wherein the cavity region forms one of the cavity C as stated earlier. At this point, the first semi-cylindrical protrusion 30b, which protrudes in a direction from the inner wall 12 to the cavity region of the lower die 10, enters the first stay passage hole 2a. Consequently, as will be elaborated later, the cylindrically projected area A, created about the first stay passage hole 2a and exposed exteriorly of the trim cover assembly 2, is pressed by that first semi-cylindrical protrusion 30b, so that the cylindrically projected area A is forcibly turned over relative to the stay passage hole 2a into the inside of the trim cover assembly 2.

The first stay receiving element 30 has: a first stay receiving recession 30c of semi-circular cross-section, which is adapted to receive the first substantially-rectilinear stay portion 5a of the headrest stay 5; and a pair of mating surfaces 30d and 30d defined flush with the first mating surface 10a of the lower die 10, wherein such pair of mating surfaces 30d are situated on the opposite sides of and symmetrically relative to the first stay receiving recession 30c, as shown.

The first semi-cylindrical protrusion 30b is tapered or so formed to become mailer in thickness as it proceeds to the distal end thereof. This first semi-cylindrical protrusion 30b has: a first extension surface region B which forms one local area of first and second surfaces 30A that define the first stay receiving recession 30c therein; and a curved surface F which is defined in the undersurface of the first extension surface region B so as to coverage from the outer surface of the semi-cylindrical protrusion 30b towards the distal end thereof. Such curved surface F functions to cause the cylindrically projected area A to turn over curvilinearly therealong in a direction to the inside of the trim cover assembly 2, as will be described later.

Although not shown, a pair of the aforementioned first stay receiving elements 30 and 30 are actually provided in the first mating surface 10a of the lower die 10, such that one thereof is situated on the left, while the other thereof situated on the right. In other words, the left- and right-side first stay receiving elements 30 and 30 are provided in the lower die 10. It is to be understood that the right-side first stay receiving element 30 is so configured to receive a part of lower half of the first substantially-rectilinear stay portion 5a, whereas the left-side first stay receiving element 30 so configured to receive a part of lower half of the second substantially-rectilinear stay portion 5b. Also, though not shown, a pair of the aforementioned second stay receiving elements 40 and 40 are actually provided in the second mating surface 20a of the upper die 20, such that one thereof is situated on the left, while the other thereof situated on the right. In other words, the left- and right-side second stay receiving elements 40 and 40 are provided in the upper die 20. It is to be understood that the right-side second stay receiving element 40 is so configured to embracingly overlie a part of upper half of the first substantially-rectilinear stay portion 5a, whereas the left-side first stay receiving element 40 so configured to embracingly overlie a part of lower half of the second rectilinear stay portion 5b. Hence, it is to be understood that, when mating the upper die 20 with the lower die 10, the first substantially-rectilinear stay portion 5a is partly sandwiched between the right-side first and second stay receiving elements 30 and 40, whereas the second substantially-rectilinear stay portion 5b partly sandwiched between the left-side first and second stay receiving elements 30 and 40.

With regard to the second stay receiving element 40, any further detailed description is omitted as to its second stay receiving recession 40c, second semi-cylindrical main portion 40a, and second semi-cylindrical protrusion 40b having a second extension surface region D, since this second stay receiving element 40 is identical in shape and structure to the first stay receiving element 30. (See FIG. 2)

Figure 5:
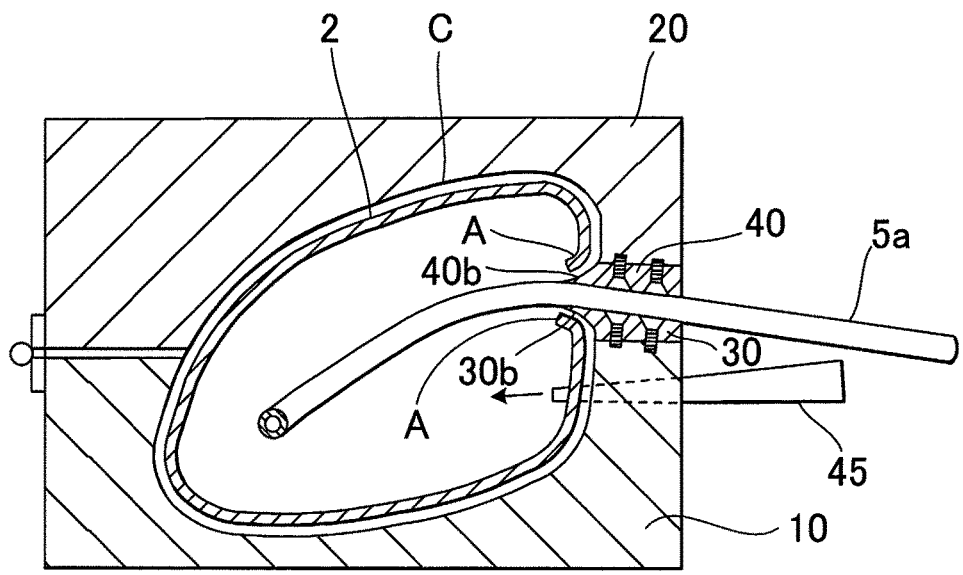
FIG. 5 is a sectional view showing a state where a trim cover assembly is placed in upper and lower dies of the foaming die device.

A description will be made of a process for forming a headrest HR by use of the foaming die device 1. As shown in FIG. 2, the upper die 20 is moved away from the lower die 10 to open the foaming die device 1. Thereafter, as seen in FIG. 5, a hollow trim cover assembly 2 with the headrest stay 5 installed therein as described earlier is placed and set in a cavity C defined between the two cavity regions of the upper and lower dies 20 an 10. This is a closed state of the foaming die device 1, in which the upper die 20 is mated with the lower die 10. But, prior thereto, it is to be understood that the two cylindrically projected areas A and A have been created from and about the first and second stay passage holes 2a and 2b of the trim cover assembly 2, respectively, thus projecting outwardly of the trim cover assembly 2, due to the reasons stated previously, and that, when placing the trim cover assembly 2 in the cavity region of the lower die 10, a worker should first press the bottom wall 2c of the trim cover assembly 2 against the left- and right-side first semi-cylindrical protrusions 30b and 30b and then place two lower half regions respective of the first and second rectilinear stay portions 5a and 5b of the headrest stay 5 in the right- and left-side first stay receiving recessions 30c and 30c of the lower die 10, respectively.

While not shown, at this stage, when the worker presses the trim cover assembly's bottom wall 2c against the inner wall of the lower die 10 towards the afore-said pair of first semi-cylindrical protrusions 30b and 30b, it is to be understood that the two first semi-cylindrical protrusions 30b and 30b are inserted into the first and second stay passage holes 2a and 2b, respectively, which in turn causes the two lower halves of the afore-said two cylindrically projected areas A and A to turn over relative to those two holes 2a and 2b, respectively, with the result that all the two lower halves of the two cylindrically projected areas A and A are entirely folded into the inside of the trim cover assembly 2 and positioned therein. Thereafter, it is to be understood that the worker moves the upper die 20 towards the lower die 10 in which the trim cover assembly 2 has been placed as above, in such a way that the inner wall of the upper die 20, where the left- and right-side second semi-cylindrical protrusions 40b and 40b exist, comes to contact with the bottom wall 2c of the trim cover assembly 2.

At this point, though not shown, as the inner wall of the upper die 20 comes to contact with the bottom wall 2c of the trim cover assembly 2, it is to be understood that the right- and left-side second semi-cylindrical protrusions 40b and 40b are inserted into the first and second stay passage holes 2a and 2b, respectively, which in turn causes two upper halves respective of the two cylindrically projected areas A and A to turn over in relation to those two holes 2a and 2b, respectively, with the result that all the two upper halves of the two cylindrically projected areas A and A are entirely folded into the inside of the trim cover assembly 2 and positioned therein. Subsequent thereto, the upper die 20 is completely mated with the lower die 10 to close the foaming die device 1, so that two upper half regions respective of the first and second rectilinear stay portions 5a and 5b are partly covered by the right- and left-side second stay receiving recessions 40c and 40c of the upper die 20, respectively, in an embraced manner. Hence, it is to be understood that a whole of the trim cover assembly 1 is securely placed within the cavity C, and the first substantially-rectilinear stay portion 5a is sandwiched between the right-side first and second stay receiving recessions 30c and 40c, whereas the second substantially-rectilinear stay portion 5b sandwiched between the left-side first and second stay receiving recessions 30c and 40c. It is therefore to be appreciated that, a worker has only to set the hollow trim cover assembly 1 in the cavity C of the foaming die device 1 and simply cause the two cylindrically projected areas A and A exposed exteriorly of the trim cover assembly to turn over at the first and second semi-cylindrical protrusions 30b and 40b relative to the two stay passage holes 2a and 2b, respectively, into the inside of the trim cover assembly 1. This eliminates the previously-described conventional preliminary steps requiring troublesome use of cylindrical sticks to press and turn over the cylindrically projected areas into the inside of trim cover assembly.

Figure 6:
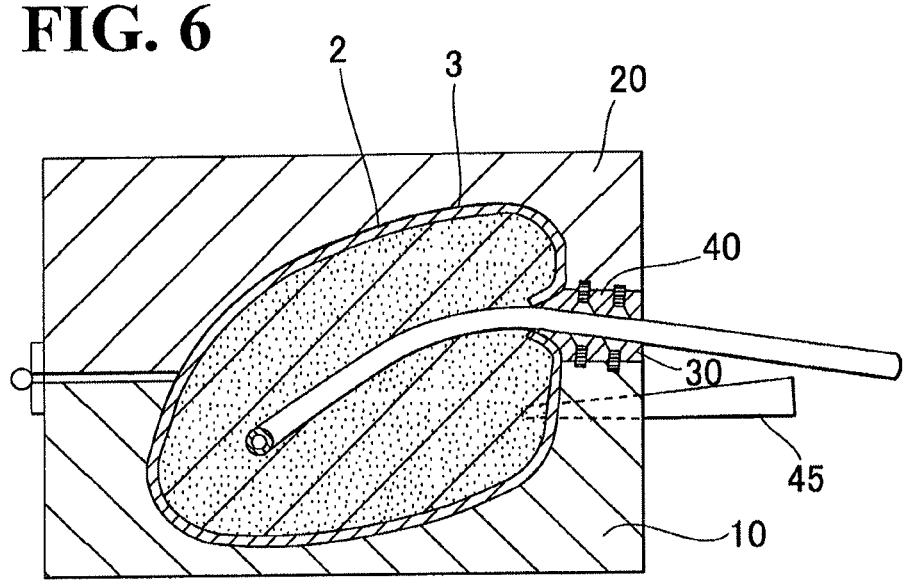
FIG. 6 is a sectional view showing a state where a liquid foaming agent has been injected and cured in the trim cover assembly placed in the upper and lower dies.

Thereafter, as shown in FIGS. 5 and 6, a liquid foaming agent is injected, via an injection nozzle 45 inserted in the lower die 10, into the inside of the trim cover assembly 2 and cured to form an increased mass of foam padding 3 filled in trim cove assembly 2. During this foaming process, both two cylindrically projected areas A and A, which project interiorly of the trim cover assembly 2, are forcibly brought by such increased mass of foam padding 3 to close contact about the first and second substantially-rectilinear stay portions 5a and 5b of the headrest stay 5, respectively. Thereby, all those two cylindrically projected areas A and A are positively retained against movement from the two substantially-rectilinear stay portions 5a and 5b, respectively.

At the completion of this foaming, the upper and lower dies 20 and 10 are rotated away from each other relative to the hinge 6 to open the foaming die device 1. With this opening, it is to be understood that the right-side first and second semi-cylindrical protrusions 30b and 40b are disengaged from each other, while being simultaneously withdrawn outwardly from the first stay passage hole 2a, whereas at the same time, the left-side first and second semi-cylindrical protrusions 30b and 40b are also disengaged from each other, while being simultaneously withdrawn outwardly from the second stay passage hole 2b. Thus, all the semi-cylindrical protrusions 30b and 40b are automatically removed from all the two stay passage holes 2a and 2b at one time, when opening the foaming die device 1. Consequently, a resulting headrest HR is obtained, in which both two cylindrically projected areas A and A created about the respective first and second stay insertion holes 2a and 2b are firmly retained in the foam padding 3 and prevented from being exposed exteriorly of the trim cover assembly 2 at peripheral regions of the first and second substantially-rectilinear stay portions 5a and 5b, respectively. Hence, the outer appearance of the headrest HR is improved aesthetically.

Additionally, in accordance with the present invention, it is to be appreciated that the following advantages and effects are attained:

(i) Each of the left-side first and second semi-cylindrical protrusions 30b and 40b as well as each of the right-side first and second semi-cylindrical protrusions 30b and 40b is so formed to become smaller in thickness as it proceeds to the distal end thereof. This tapered configuration in effect permits two lower halves of the first and second stay passage holes 2a and 2b to smoothly slide on and along the right- and left-side first semi-cylindrical protrusions 30b and 30b in the longitudinal direction of the first and second substantially-rectilinear stay portions 5a and 5b, respectively, thereby being easily turned over along the curved surface F of that semi-cylindrical protrusion 30b relative to the first stay passage hole 2a and entered into the inside of the trim cover assembly 2, while on the other hand permitting two upper halves of the first and second stay passage holes 2a and 2b to smoothly slide on and along the right- and left-side second semi-cylindrical protrusions 40b and 40b in the longitudinal direction of the first and second substantially-rectilinear stay portions 5a and 5b, respectively, thereby being easily turned over along the curved surface F of that semi-cylindrical protrusion 40b relative to the second stay passage hole 2b and entered into the inside of the trim cover assembly 2. Thus, it is possible for a worker to easily cause complete insertion of all the first and second semi-cylindrical protrusions 30a and 30b into all the corresponding stay passage holes 2a and 2b in assured manner.

(ii) The first and second stay receiving elements 30 and 40 themselves are provided independently of the lower and upper dies 10 and 20, respectively. When those two stay receiving elements 30 and 40 become worn out of use, it is easily possible to replace them all or either of them by new corresponding stay receiving element (s). Moreover, one or both of the two stay receiving elements 30 and 40 can be modified in terms of technical design and specifications, as required.

(iii) Also, the first and second stay receiving elements 30 and 40 can be easily secured to and removed from the lower and upper dies 10 and 20, respectively, by use of the screws 1, which enables a worker to easily replace one or both of those two stay receiving elements 30 and 40 by a new corresponding stay receiving element (s).

Figure 7:
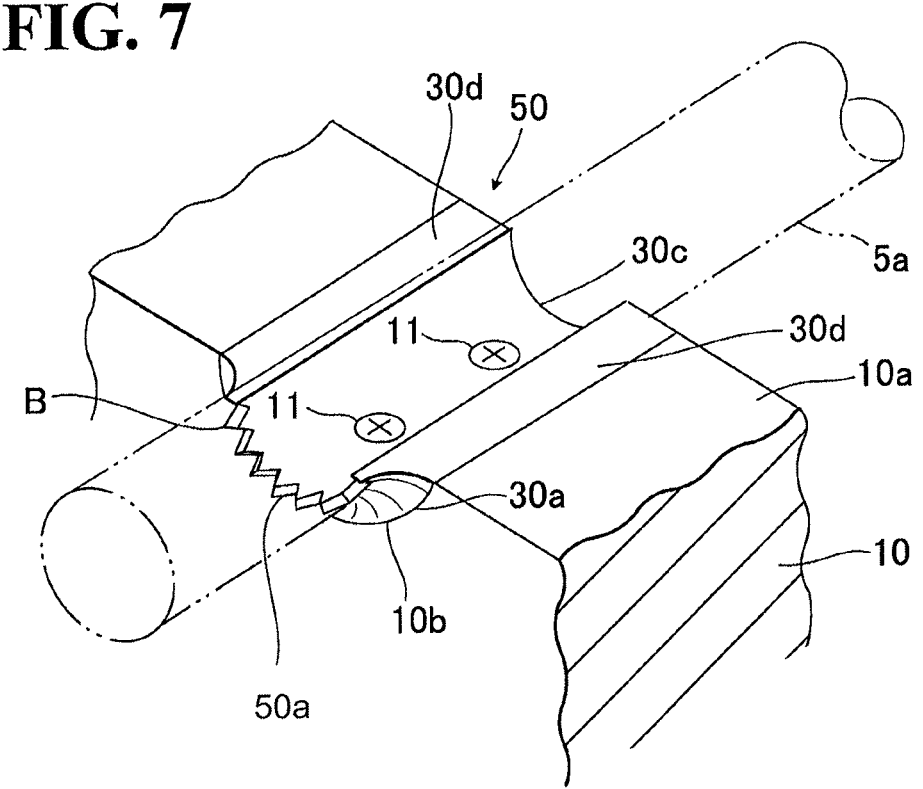
FIG. 7 is a partly broken perspective view showing another mode of stay receiving element provided in the lower die of the foaming die device.
Figure 8:
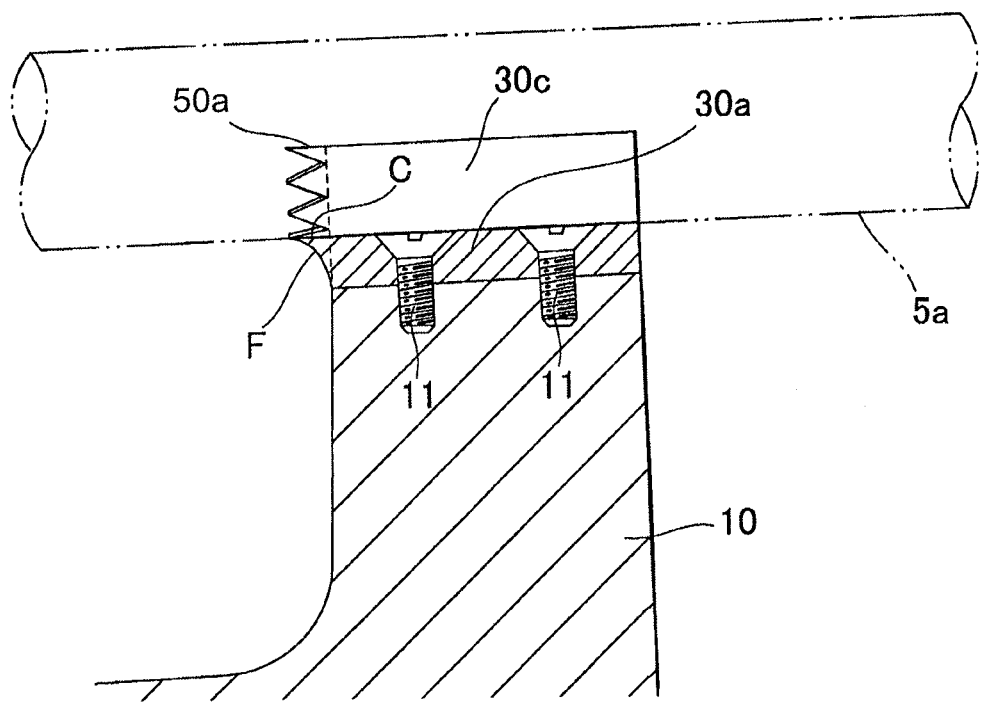
FIG. 8 is a fragmentary sectional view showing such another mode of stay receiving element provided in the lower die.

FIGS. 7 and 8 illustrate a second alternative embodiment of the present invention, wherein another stay receiving element 50 is provided, which has a toothed semi-cylindrical protrusion 50a. This embodiment indicates that each of the foregoing first and second stay receiving elements 30 and 40 may be formed to have a toothed distal end. Namely, as far as the embodiment of FIGS. 7 and 8 is concerned, the stay receiving element 50 corresponds to the first stay receiving element 30, and therefore, the first stay receiving element 30 may be formed with a toothed semi-cylindrical protrusion identical to the toothed semi-cylindrical protrusion 50a of the stay receiving element 50. The same goes for the second stay receiving element 40. In other words, it is to be understood that a first toothed semi-cylindrical protrusion 30b and a second toothed semi-cylindrical protrusion 40b may be provided in the lower and upper dies 10 and 20, respectively. It is noted that all like designations given in the FIGS. 7 and 8 correspond to all like designations in FIGS. 1 to 6, and any further description on common parts and elements between this second embodiment and the foregoing first embodiment shown in FIGS. 1 to 6 is omitted for the sake of simplicity of description. According to the present second embodiment, the toothed mode provides a plurality of pointed distal ends in each of the first and second semi-cylindrical protrusions 30 and 40. Such pointed distal ends are effective in reducing a coefficient of friction between the bottom wall 2c of the trim cover assembly 2 and the first and second semi-cylindrical protrusions 30b and 40b. With this arrangement, it is to be appreciated that the right-side first and second semi-cylindrical protrusions 30b and 40b can be smoothly inserted in the first stay passage hole 2a in a less frictional contact with the bottom wall 2c of the trim cover assembly 2, and also, the left-side first and second semi-cylindrical protrusions 30a and 40a can be smoothly inserted in the second stay passage hole 2b in a less frictional contact with the bottom wall 2c.

Finally, it should be understood that the invention is not limited to the illustrated embodiment, but any modification, replacement and addition may be applied thereto, without departing from the scope of the appended claims.

What is claimed is:

1. A foaming die device, which is so constructed as to allow accommodation therein of a trim cover assembly in which a headrest stay is installed therein such that at least one stay portion of said headrest stay passes through at least one stay passage hole of said trim cover assembly and is exposed exteriorly of the trim cover assembly, wherein a projected area is created in a peripheral end of said at least one stay passage hole and laid on and about said at least one stay portion so as to be exposed exteriorly of the trim cover assembly, and further allow a liquid foaming agent to be injected into an inside of said trim cover assembly and cured therein, to thereby form a headrest having said at least one stay portion exposed exteriorly thereof, said foaming die device comprising:
an upper die having a cavity region and a second mating surface;
a lower die having a cavity region and a first mating surface adapted to be mated with said second mating surface of said upper die;
said upper and lower dies being able to be mated with and separated from each other;
wherein, when said upper and lower dies are mated with each other, a cavity is defined between said cavity region of said upper die and said cavity region of said lower die, said cavity being of such a dimension as to accommodate a whole of said trim cover assembly therein,
a first stay receiving recession formed in said first mating surface of said lower die, said first stay receiving recession being so configured to receive said at least one stay portion;
a second stay receiving recession formed in said second mating surface of said upper die, said second stay receiving recession being so configured to receive said at least one stay portion;
a first protrusion provided in said lower die, said first protrusion protruding in a direction from an inner wall of said lower die towards said cavity region of said lower die;
a second protrusion provided in said upper die, said second protrusion protruding in a direction from an inner wall of said upper die towards said cavity region of said upper die; and
said first and second protrusions being adapted to press and turn over the trim cover assembly around said at least one stay passage hole to form said projected area relative to said at least one stay passage hole into the inside of said trim cover assembly when said upper and lower dies are mated, and to maintain said projected area while said liquid foaming agent is injected into said inside of said trim cover assembly.

2. The foaming die device as claimed in claim 1, wherein said first protrusion is so formed to become small in thickness as it proceeds to a distal end thereof and have an extension surface forming one part of a wall surface of a first wall which defines said first stay receiving recession, whereas said second protrusion is so formed to become small in thickness as it proceeds to a distal end thereof and have an extension surface forming one part of a wall surface of a second wall which defines said second stay receiving recession.

3. The foaming die device as claimed in claim 1, wherein a first stay receiving element is securely provided to said lower die, said first stay receiving element being adapted to receive said at least one stay portion of said headrest stay, wherein a second stay receiving element is securely provided to said upper die, said second stay receiving element being adapted to receive said at least one stay portion of said headrest stay, wherein said first stay receiving element comprises a first body portion secured to said lower die and including said first protrusion, wherein the first protrusion extends into said cavity region of said lower die, wherein said second stay receiving element comprises a second body portion secured to said upper die and including said second protrusion, and wherein the second protrusion extends into said cavity region of said upper die.

4. The foaming die device as claimed in claim 1, wherein a first stay receiving element is securely provided to said lower die, said first stay receiving element being adapted to receive said at least one stay portion of said headrest stay, wherein a second stay receiving element is securely provided to said upper die, said second stay receiving element being adapted to receive said at least one stay portion of said headrest stay, wherein said first stay receiving element comprises a first body portion secured to said lower die and including said first protrusion, wherein said first protrusion extends into said cavity region of said lower die, wherein said second stay receiving element comprises a second body portion secured to said upper die and including said second protrusion, wherein the second protrusion protrudes into said cavity region of said upper die, wherein said first protrusion is so formed to become small in thickness as it proceeds to a distal end thereof and have an extension surface forming one part of a wall surface of a first wall which defines said first stay receiving recession, whereas said second protrusion is so formed to become small in thickness as it proceeds to a distal end thereof and have an extension surface forming one part of a wall surface of a second wall which defines said second stay receiving recession.

5. The foaming die device as claimed in claim 3, wherein said first body portion and said first protrusion, associated with said first stay receiving element, are both formed in a substantially semi-cylindrical shape, wherein said first body portion of said first stay receiving element is securely connected to said lower die by at least one securing screw, wherein said second body portion and said second protrusion, associated with said second stay receiving element, are both formed in a substantially semi-cylindrical shape, and wherein said second body portion of said second stay receiving element is securely connected to said upper die by at least one securing screw.

\* \* \* \* \*